(12) United States Patent
Stephenson et al.

(10) Patent No.: US 7,131,584 B2
(45) Date of Patent: Nov. 7, 2006

(54) APPARATUS AND MEANS FOR UPDATING A MEMORY DISPLAY

(75) Inventors: Stanley W. Stephenson, Spencerport, NY (US); Xiang-Dong Mi, Rochester, NY (US); David M. Johnson, West Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 171 days.

(21) Appl. No.: 10/712,175

(22) Filed: Nov. 13, 2003

(65) Prior Publication Data
US 2005/0103853 A1   May 19, 2005

(51) Int. Cl.
*G06K 15/00* (2006.01)

(52) U.S. Cl. .............. 235/383; 235/462.15; 340/5.91; 349/22; 349/24; 365/108

(58) Field of Classification Search .......... 235/462.15, 235/462.13; 705/20; 340/5.91; 349/21, 349/22, 24; 365/108
See application file for complete search history.

(56) References Cited

U.S. PATENT DOCUMENTS

| | | | |
|---|---|---|---|
| 3,401,262 A * | 9/1968 | Anderson et al. ............ 250/331 |
| 4,752,820 A * | 6/1988 | Kuroiwa et al. ............. 365/108 |
| 5,055,662 A * | 10/1991 | Hasegawa ................... 235/492 |
| 5,193,201 A * | 3/1993 | Tymes ........................ 708/191 |
| 5,437,811 A | 8/1995 | Doane et al. |
| 5,448,226 A | 9/1995 | Failing, Jr. et al. |
| 5,695,682 A | 12/1997 | Doane et al. |
| 5,751,257 A | 5/1998 | Sutherland |
| 5,771,005 A | 6/1998 | Goodwin, III |
| 5,861,817 A * | 1/1999 | Palmer et al. ............. 340/5.91 |
| 6,130,603 A | 10/2000 | Briechle |
| 6,155,487 A * | 12/2000 | Dean et al. .................. 235/383 |
| 6,186,555 B1 | 2/2001 | Rawlings |
| 6,269,342 B1 * | 7/2001 | Brick et al. .................... 705/20 |
| 6,394,870 B1 | 5/2002 | Petruchik et al. |
| 6,423,368 B1 | 7/2002 | Stephenson et al. |
| 6,639,637 B1 | 10/2003 | Stephenson |
| 6,885,409 B1 * | 4/2005 | Stephenson et al. .......... 349/22 |
| 6,908,033 B1 * | 6/2005 | Capurso et al. ............. 235/383 |
| 2002/0005827 A1 * | 1/2002 | Kobayashi ................... 345/87 |
| 2002/0012042 A1 * | 1/2002 | Kobayashi et al. .......... 347/239 |
| 2003/0222139 A1 * | 12/2003 | Stephenson et al. ........ 235/383 |
| 2004/0044709 A1 * | 3/2004 | Cabrera et al. ............. 708/191 |
| 2005/0030158 A1 * | 2/2005 | Schulmerich et al. ...... 340/5.91 |
| 2005/0104806 A1 * | 5/2005 | Stephenson, III ............ 345/50 |

OTHER PUBLICATIONS

U.S. Appl. No. 10/134,185, filed Apr. 29, 2002 by Stephenson et al.
U.S. Appl. No. 10/455,050, filed Jun. 5, 2003 by Stephenson et al.
U.S. Appl. No. 10/256,930, filed Sep. 27, 2002 by Stephenson et al.
U.S. Appl. No. 10/178,979, filed Jun. 25, 2002 by Capurso et al.

* cited by examiner

*Primary Examiner*—Jared J. Fureman
(74) *Attorney, Agent, or Firm*—Lynne M. Blank

(57) ABSTRACT

A display system includes a light writable display associated with an identification code and arranged to receive an image wise pattern of light to form an image on the display; a display writer for producing the image wise pattern of light for writing the image on the display; a scanner connected to the display writer for sensing the identification code; and a processor linked to the scanner and the display writer and responsive to the identification code for programming the display writer to write an image associated with the identification code.

21 Claims, 8 Drawing Sheets

APPARATUS AND MEANS FOR UPDATING A MEMORY DISPLAY

FIELD OF THE INVENTION

The present invention relates to an apparatus for updating memory displays.

BACKGROUND OF THE INVENTION

Retail stores offer goods for sale and need to provide customers with information on item pricing. Price labels typically provide information describing an item, the price for that item, and a machine readable code for the item, typically in UPC bar code format. The price of items often changes rapidly, requiring that printed retail labels be manually changed. Items that are on sale often have a larger secondary label, called a shelf-talker, that highlights items on sale for customers. The process of writing and changing retail pricing is costly, primarily in the labor required to replace tags. Systems have been proposed to address the problem of using digital data transmission to electrically changeable retail labels known as Electronic Shelf Labels (ESL).

U.S. Pat. No. 5,448,226, issued Sep. 5, 1995 to Failing, Jr. et al. describes an ESL system having a plurality of electronic price labels fitted into rails. The rails provide power and communication to each label. Connection to the rail can be provided through direct electrical connection to a conductor in the rail or a radio frequency (RF) interface. The label can be powered though direct electrical connection to power conductors in the rail, a battery or solar cell. Such a system requires expensive complex electronic and communication structures.

U.S. Pat. No. 6,186,555, issued Feb. 13, 2001 to Rawlings describes paper shelf-talkers that can be attached to conventional paper shelf labels to identify items on sale. Adhesive strips are applied to a perforated substrate that is printed to align text with the adhesive label. Attaching such a shelf-talker to a label requires the assembly to be discarded when pricing is changed. U.S. Pat. No. 5,771,005, issued Jun. 23, 1998 to Goodwin III describes an auxiliary electronic display that can be attached to an electronic price label (sic). The auxiliary display acts as an electronic shelf talker to identify special prices on goods.

U.S. Pat. No. 6,130,603, issued Oct. 10, 2000 to Briechle provides a good reference for current Electronic Shelf Labels. Independent modules contain a power supply, antenna and controller. The controller is attached to a conventional liquid crystal display that requires periodic refreshing to maintain an image. Displays in ESLs currently display data on simple seven segment numeric data. An internal power supply expends about half its power maintaining the display image and the other half of the power maintaining the RF link. Such displays have limited display resolution, and must incorporate expensive and bulky controller and transmission electronics. Such displays further must incorporate a power supply which further increases cost and size.

U.S. Pat. No. 5,751,257 issued May 12, 1998 to Sutherland shows an electronic shelf label having first and second substrates. Sutherland omits the expensive controller and power portions of the ESL, using a programming device translated across a series of pins and to write segments of an electronic display formed between the two glass substrates. The Sutherland apparatus requires the device to be positioned at a specific initial position, and translate specific sequence and rate to update the shelf tag. The information displayed in the Sutherland apparatus is limited to low resolution images.

There is a need therefore for an improved display system having a low cost rewritable shelf label with high resolution.

SUMMARY OF THE INVENTION

The need is met according to the present invention by providing a display system that includes a light writable display associated with an identification code and arranged to receive an image wise pattern of light to form an image on the display; a display writer for producing the image wise pattern of light for writing the image on the display; a scanner connected to the display writer for sensing the identification code; and a processor linked to the scanner and the display writer and responsive to the identification code for programming the display writer to write an image associated with the identification code.

DETAILED DESCRIPTION OF THE INVENTION

Figure 1:
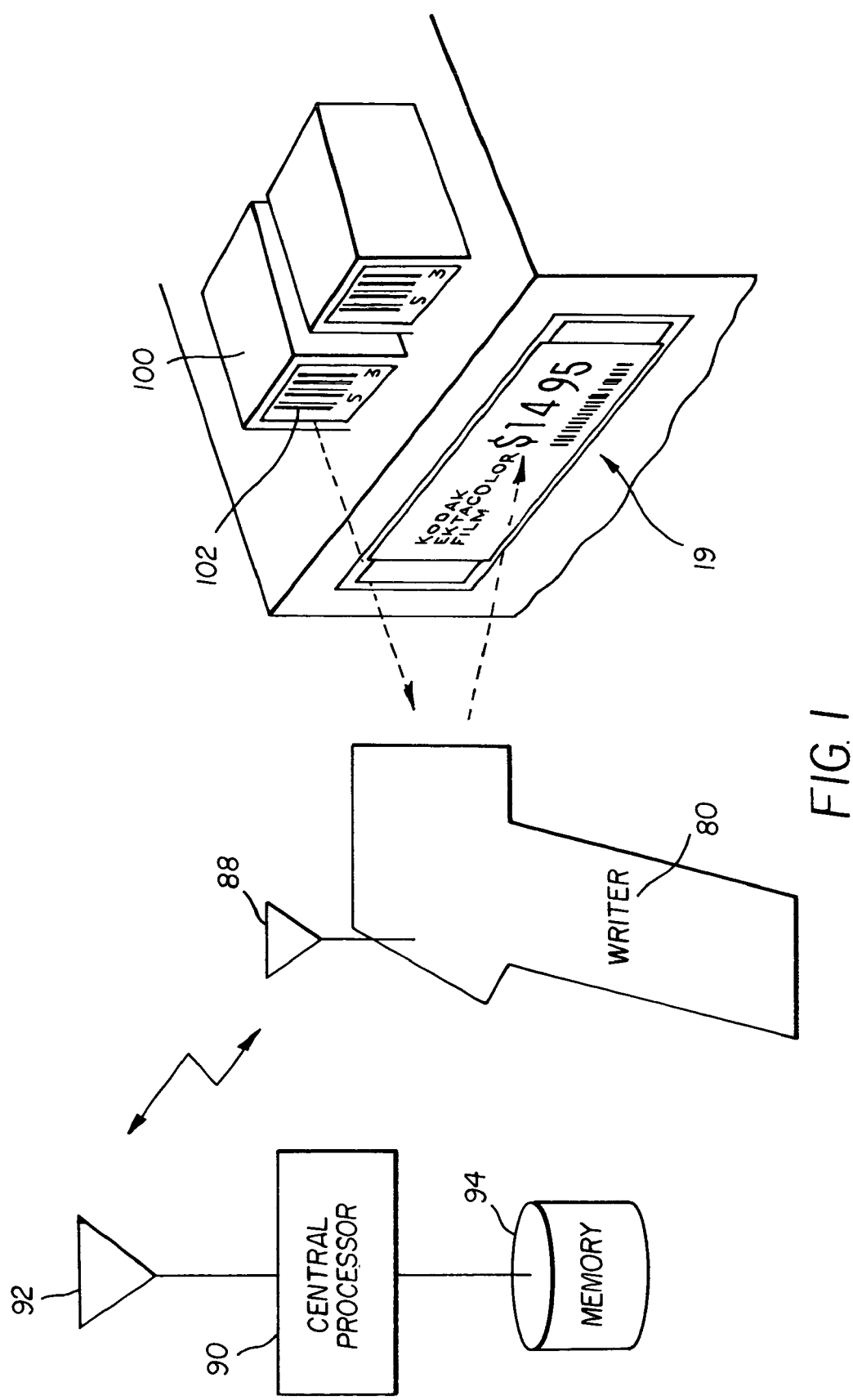
FIG. 1 is a schematic view of a label writing system in accordance with the present invention.

FIG. 1 is a schematic view of a label writing system in accordance with the present invention. A label 19 displays information about an object 100. Objects 100 can be objects for retail sale or inventory items. Objects 100 have an associated object identity code 102. The code 102 can be attached to individual items or adjacent to a set of one or more objects. Scanner/writer 80 contains means to scan an identification code 102 and write label 19.

Scanner/writer 80 has means to scan an object identity code 102 and select label image data for label 19 associated with a specific object 100. Scanner/writer 80 further contains memory means to create label image data associated with an identification code 102 or access such data via writer antenna 88 to retrieve label image data from a central processor 90 using a conventional wireless network. Central processor 90 receives requests for label image data from processor antenna 92 from the wireless network. Central processor 90 retrieves label image data from central memory 94, and transmits the data via processor antenna 92 to the scanner/writer 80 that made the request.

Figure 2:
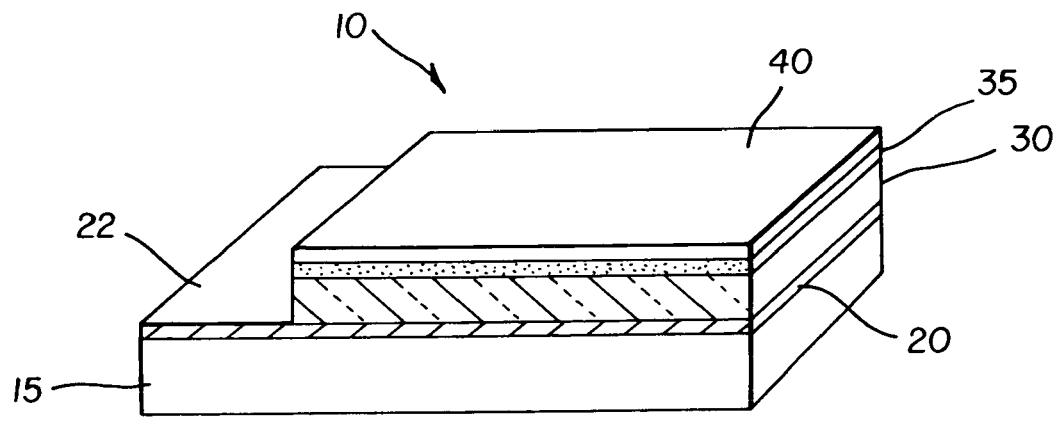
FIG. 2 is a partial perspective view of a display incorporated into a label in accordance with the present invention.

FIG. 2 is a perspective of a display incorporated into a label in accordance with the present invention. Display 10 includes a flexible display substrate 15, which is a thin transparent polymeric material, such as Kodak Estar film base formed of polyester plastic that has a thickness of between 20 and 200 microns. In an exemplary embodiment, display substrate 15 can be a 125-micron thick sheet of polyester film base. Other polymers, such as transparent polycarbonate, can also be used.

A first conductor 20 is formed on display substrate 15. First conductor 20 can be tin-oxide, indium-tin-oxide (ITO), or a transparent organic conductor such as polythiophene, with ITO being the preferred material. Typically the material of first conductor 20 is sputtered or coated as a layer over display substrate 15 having a resistance of less than 1000 ohms per square. First conductor 20 can also be formed by printing a transparent organic conductor such as PEDT/PSS, PEDOT/PSS polymer, which materials are sold as Baytron® P by Bayer AG Electronic Chemicals. A portion 22 of first conductor 20 does not contain subsequent layers to provide exposed first conductor.

Cholesteric liquid crystal light modulating layer 30 overlays first conductor 20. Cholesteric liquid crystal light modulating layer 30 contains cholesteric liquid crystal material, such as those disclosed in U.S. Pat. No. 5,695,682 issued Dec. 9, 1997 to Doane et al., the disclosure of which is incorporated by reference. Such materials are made using highly anisotropic nematic liquid crystal mixtures and adding a chiral doping agent to provide helical twist in the planes of the liquid crystal to the point that interference patterns are created that reflect incident light. Application of electrical fields of various intensity and duration can be employed to drive a chiral nematic material (cholesteric) into a reflective state, to near transparent state, or an intermediate state. These materials have the advantage of having stable optical states in the absence of an electrical field. The materials can maintain a given optical state indefinitely after the field is removed. Cholesteric liquid crystal materials can be formed using a two component system such as MDA-00-1444 (undoped nematic) and MDA-00-4042 (nematic with high chiral dopant concentrations) available from E.M. Industries of Hawthorne, N.Y.

In a preferred embodiment, cholesteric liquid crystal light modulating layer 30 is a cholesteric liquid crystal dispersed in de-ionized photographic gelatin. The liquid crystal material is mixed at 8% cholesteric liquid crystal in a 5% gelatin aqueous solution. The mixture is dispersed to create an emulsion having 8–10 micrometer diameter domains of the liquid crystal in aqueous suspension. The domains can be formed using the limited coalescence technique described in U.S. Pat. No. 6,423,368 issued Jul. 23, 2002 to Stephenson et al. The emulsion is coated over first conductor 20 on a polyester display substrate 15 and dried to provide an approximately 9-micrometer thick polymer dispersed cholesteric coating. Other organic binders such as polyvinyl alcohol (PVA) or polyethylene oxide (PEO) can be used in place of the gelatin. Such emulsions are machine coatable using coating equipment of the type employed in the manufacture of photographic films. A gel sub-layer can be applied over first conductor 20 prior to applying cholesteric liquid crystal light modulating layer 30 as disclosed in U.S. Pat. No. 6,423,368 referenced above.

Figure 3:
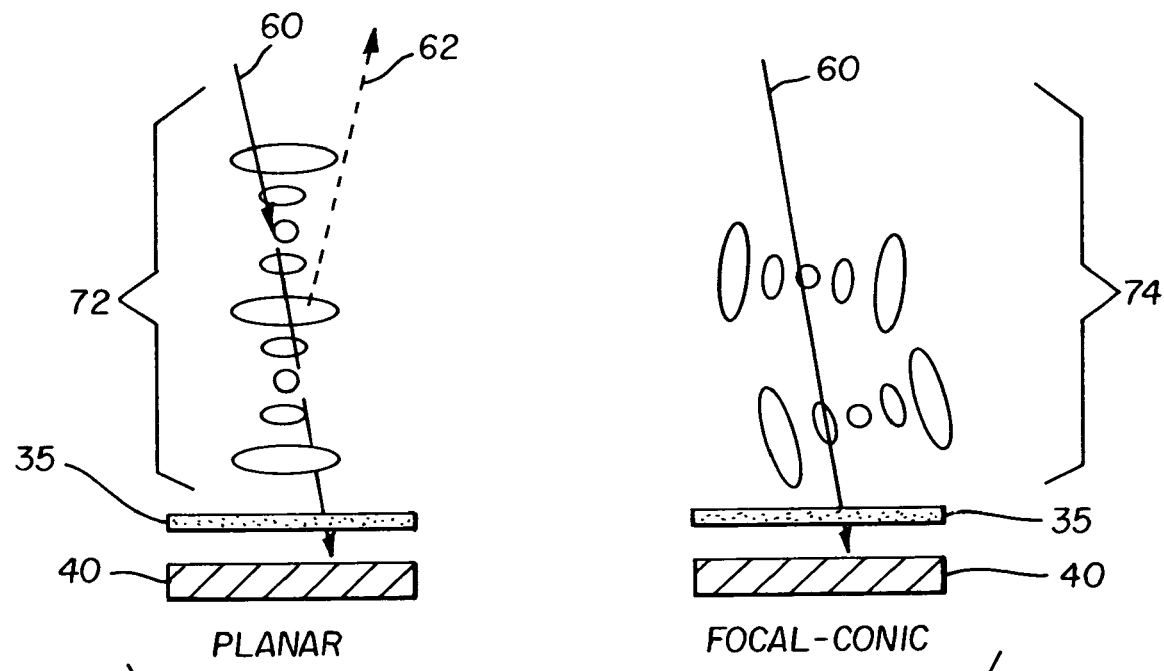
FIG. 3 is a schematic sectional view of optical states of cholesteric material in accordance with the present invention.

FIG. 3 is a schematic side sectional view of a chiral nematic material in a planar and focal conic state responding to incident light. In the figure on the left, after a high voltage field has been applied and quickly switched to zero potential, the liquid crystal molecules become planar liquid crystal 72, which reflect portions of incident light 60 as reflected light 62. In the figure on the right side of FIG. 2, upon application of a lower voltage field, the molecules of the chiral nematic material break into weakly forward scattering cells known as focal conic liquid crystal 74. Increasing the time duration of a low voltage pulse creates optical states between reflective planar liquid crystal 72 and light scattering focal conic liquid crystal 74.

A light absorber 35 is positioned on the side opposing the incident light 60. Light absorber can be dark second conductor 40. Light absorber 35 can be a thin layer of light absorbing, sub-micron carbon in a gel binder as disclosed in U.S. Pat. No. 6,639,637 issued Oct. 28, 2003 to Stephenson. As fully evolved focal-conic liquid crystal 74, the cholesteric liquid crystal is forward light scattering and incident light 60 is absorbed by light absorber 35 to create a black image. Progressive evolution towards the focal-conic state causes a viewer to perceive reflected light 62 that transitions to black as the cholesteric material changes from reflective planar liquid crystal 72 to a fully evolved light scattering focal-conic liquid crystal 74. When the field is removed, cholesteric liquid crystal light modulating layer 30 maintains a given optical state indefinitely. The states are more fully discussed in U.S. Pat. No. 5,437,811 issued Aug. 1, 1995 to Doane et al.

Figure 4:
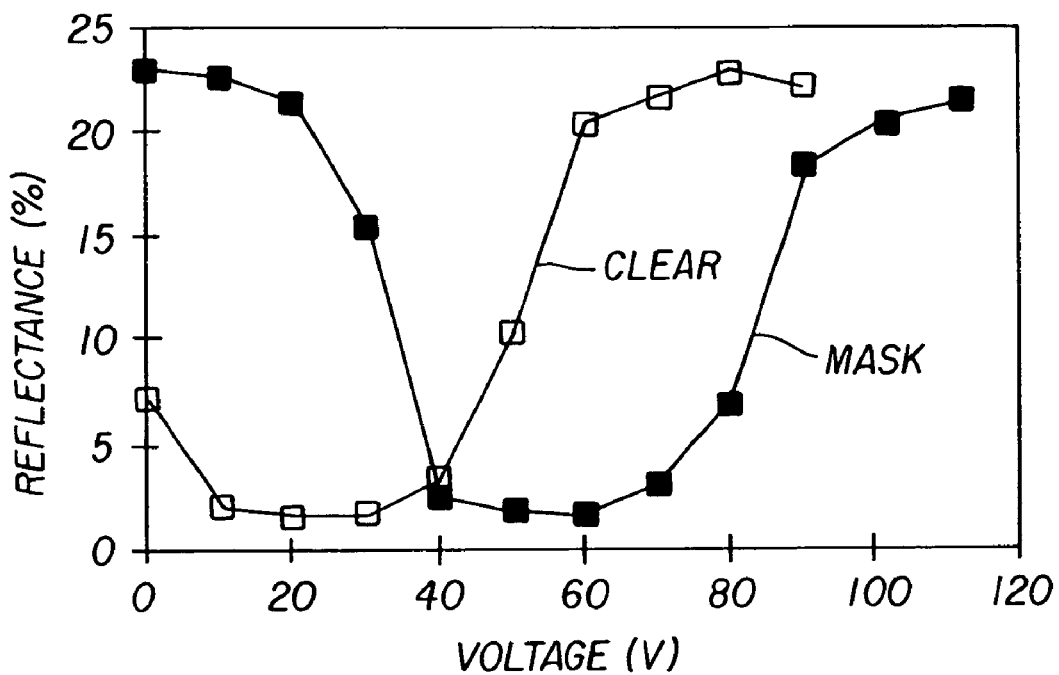
FIG. 4 is a plot of the response of a polymer dispersed cholesteric material, originally in the planar state, to constant flash unit lamp energy and various voltages.

FIG. 4 shows a plot of the response of a polymer dispersed cholesteric material, originally in the planar state, to constant flash unit lamp energy and various voltages. The curve for the masked material (filled boxes) is the same response of materials in the absence of the thermal pulse provided by flash unit 82. The clear curve is the same display in the presence of the heat pulse from the flash unit combined with an electrical field. Hysteresis between the masked and unmasked curves, at approximately 20 and 60 volts are two conditions that permit writing of displays using a combination of light and electric field. Many operating states can be found to write displays. Such states are more thoroughly discussed in copending U.S. Ser. No. 10/256,930 filed Sep. 27, 2002 by Stephenson et al. The combination of high intensity light under an electric field permits high resolution images without patterning conductors. The process eliminates the need for many drives on many conductive traces.

Returning to FIG. 2, second conductor 40 overlays or can be light absorber 35. Second conductor 40 has sufficient conductivity to provide an electric field between the first transparent conductor 20 and second conductor 40 strong enough to change the optical state of the cholesteric material in cholesteric liquid crystal light modulating layer 30. Second conductor 40 can be formed, for example, by the well known technique of vacuum deposition for forming a layer of conductive material such as aluminum, tin, silver, platinum, carbon, tungsten, molybdenum, tin or indium or combinations thereof. The layer of conductive material can be patterned using well known techniques of photolithography, laser etching or by application through a mask.

In a preferred embodiment, second conductor 40 is formed by screen printing a conductive ink such as Electrodag 423SS screen printable electrical conductive material from Acheson Corporation. Such screen printable conductive materials comprise finely divided graphite particles in a thermoplastic resin. Screen printing is preferred to minimize the cost of manufacturing the display. The light absorbing properties of the printed carbon material reduces the need for light absorber 35.

The presence of light absorber 35 permits second conductors to be formed of reflective materials. Second conductors 40 can be formed of metal, for example, by vacuum deposition of conductive materials such as aluminum, chrome or nickel. Second conductors 40 are formed by screen printing a reflective and conductive formulation such as UVAG© 0010 from Allied Photochemical of Kimball, Mich. Such screen printable conductive materials comprise finely divided silver in ultra violet curable resin. After printing, the material is exposed to ultra violet radiation greater than 0.40 Joules/cm^2, the resin will polymerize in 2 seconds to form a durable surface. The fast cure process time is advantageous in manufacturing.

Alternatively, second conductors 40 can be formed by screen printing thermally cured silver bearing resins. An example of such a material is Acheson Electrodag© 461 SS, a heat cured silver ink In the case of reflective second conductor 40, light absorber 35 can be used as a light absorbing layer that provides alternative colors, as described in copending U.S. Ser. No. 10/455,050 filed Jun. 5, 2003 by Stephenson et al.

The use of a flexible support for display substrate 15; unpatterned first conductor 20; machine coated cholesteric liquid crystal light modulating layer 30; and unpatterned second conductor 40 permits the fabrication of a low cost flexible display. The opto-electrical writing process eliminates the need for attached, expensive electronics. Small displays according to the present invention can be used as electronically rewritable tags for inexpensive limited rewrite applications.

Figure 5:
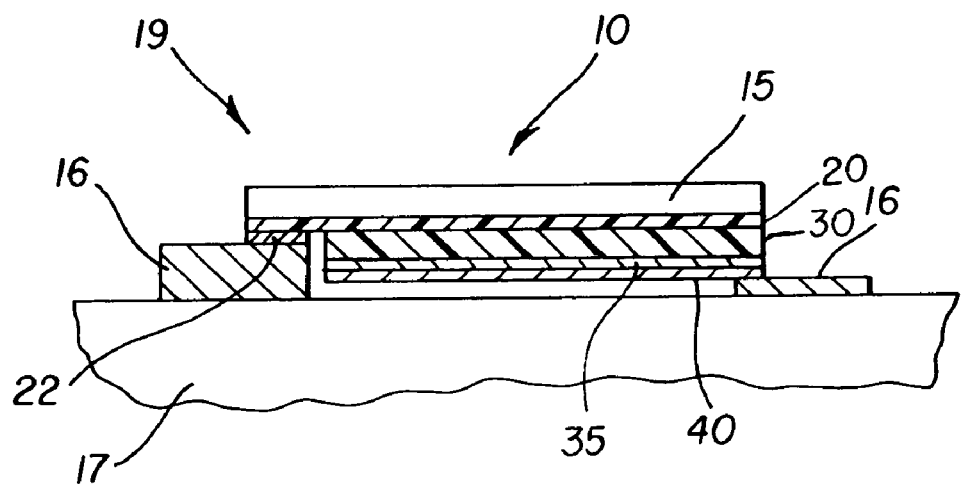
FIG. 5 is a side view of a label in accordance with the invention.

FIG. 5 is a side view of a label 19 in accordance with the invention. Display support 17 carries a display 10. Display support 17 can be a sheet of material having printed support contacts 16. Display support 17 can be made of paper or white plastic and can have an area to carry printed information. Two support contacts 16 are positioned under first conductor 20 and second conductor 40 respectively, and extend outside the perimeter of an attached display 10. A display 10, formed in accordance with FIG. 4 is positioned over support contacts 16 and bonded to display support 17 so that support contacts 16 provide an exposed electrical connection to display 10. In a preferred embodiment, an anisotropic adhesive, such 3M 9703 Electrically Conductive Tape is used, which permits electrical conduction through an adhesive but not across the adhesive.

Anisotropic adhesives consist of a conductive particle having a diameter near the thickness of adhesive binder, and dispersed at a concentration that does not conduct laterally. When display 10 is pressed onto support contacts 16, conductive particles form an electrical connection between conductors on the back of display 10 and support contacts 16. The adhesive can be thermally cured with an applied pressure to provide a permanent connection between conductors on the back of display 10 and support contacts 16.

Figure 6:
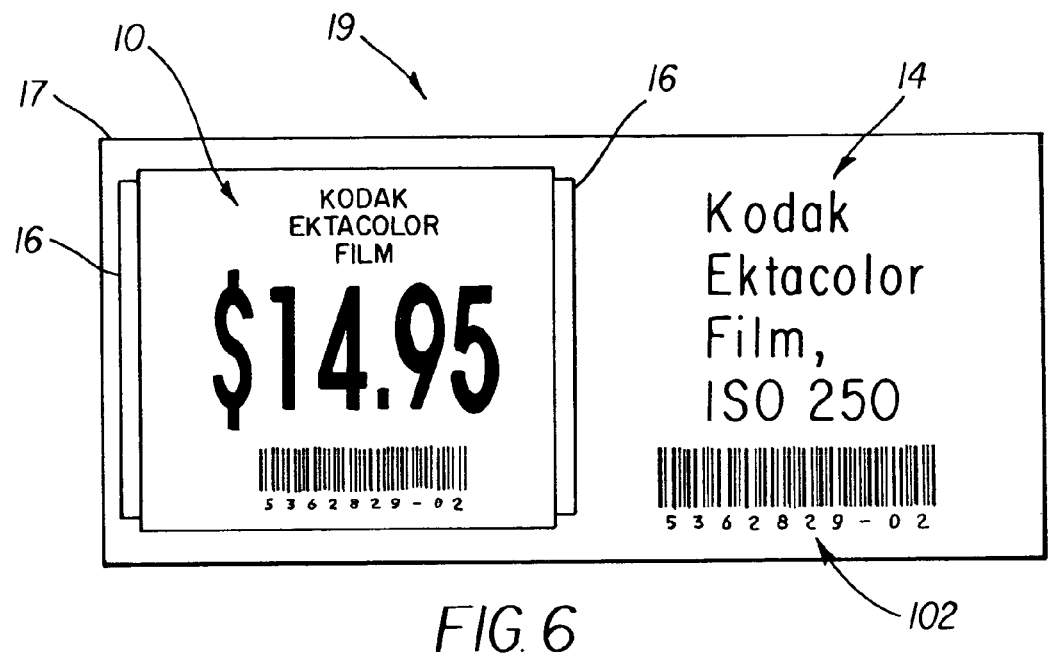
FIG. 6 is a front view of a written label in accordance with the present invention.

FIG. 6 is a front view of a label in accordance with the present invention. Two support contacts 16 are exposed for front connection of an electric field to first conductor 20 and second conductor 40 within display 10. The use of a flexible display support 17 and display 10 permit printing into areas of label 19. An additional area of display support 17 is free of display 10 to permit writing of printing 14 on display support 17.

Ink jet printers are useful in this application because ink jet print heads are spaced from a dye receiving surface by about 1.00 millimeter. Display 10 is typically less than 0.25 millimeters thick and is flexible, permitting display assembly 17 to pass through an ink jet printer an not interfere with the motion of an ink jet head over display assembly 17. Display support 17 can further include and adhesive backing and release liner. Such structures are more thoroughly discussed in copending U.S. Ser. No. 10/134,185 filed Apr. 29, 2002 by Stephenson et al.

Figure 7:
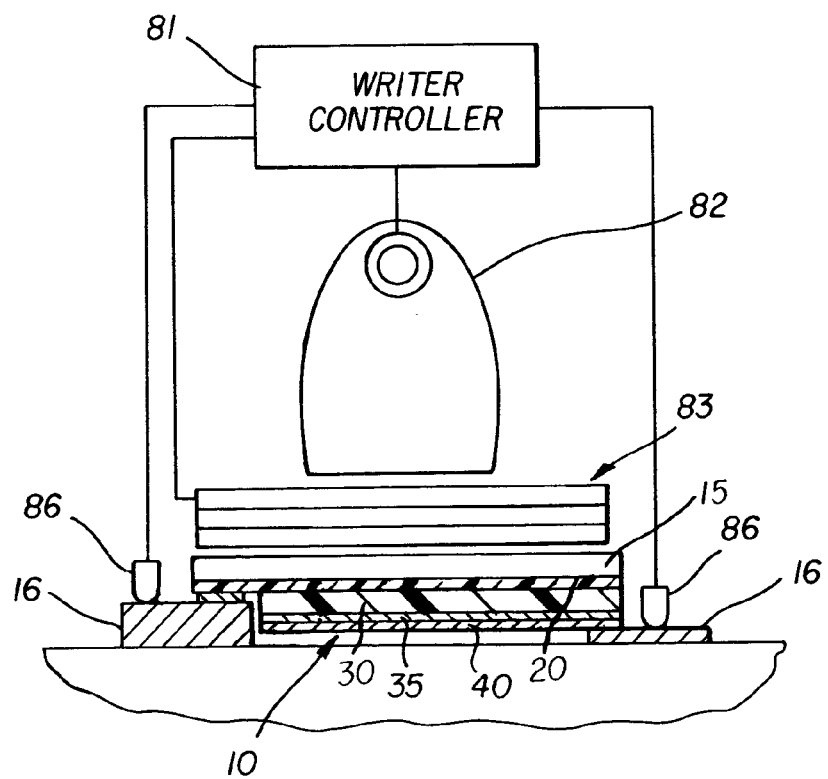
FIG. 7 is a schematic view of a label and a writer in accordance with the invention.

FIG. 7 is a schematic view of a label and light writer used with the present invention. Writer controller 81 acquires image data corresponding to an image to be printed on display 10. Masking display 83 receives image data from writer controller 81 and creates and image wise pattern of light transmitting and light blocking areas that correspond to the desired image pattern. Masking display 83 can be a simple twisted-nematic (TN) or super-twisted-nematic (STN) liquid crystal display of conventional design. Pixels on masking display 83 can be formed in an array of uniform pixels, or contain electrodes patterned to conform to types of specific images, such as seven segment digital images. Writer controller 81 provides an electrical field to writer contacts 86 which are pressed against support contacts 16 to provide an electrical field to display 10. Flash unit 82 is triggered by writer controller 81 in conjunction with application of the electrical field to form a pattern wise image on display 10 using masking display 83. By using the masking display to write onto a simple unpatterned label, an image having the higher resolution of the masking display can be provided on the label without the need for complex electrode structures in the label and corresponding contacts in the writer, thereby significantly reducing the cost of the label.

An example of a display useful as a masking display in the present invention is a dot-matrix super-twisted-nematic (STN) display, part number TM 13164 BCHG-1 from Tianma Corporation in Taiwan. The display has an array of 63 by 131 pixels at a 0.50 mm pitch. The display has a 4:1 contrast ratio, which provides modulation of high intensity light sufficient to create an image-wise pattern of high intensity light across display 10.

Figure 8:
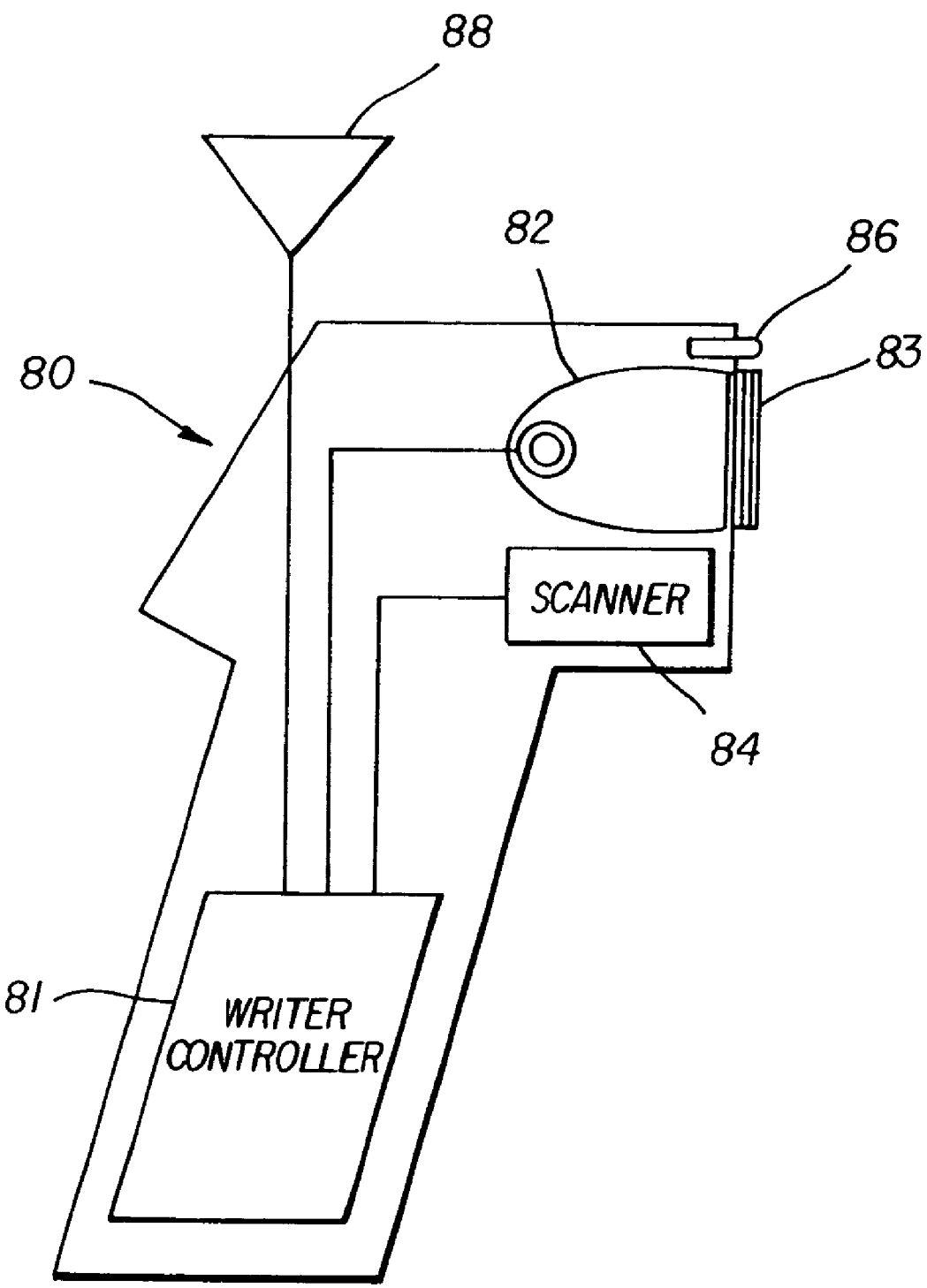
FIG. 8 is a schematic view of a writer employed with the present invention.
Figure 9:
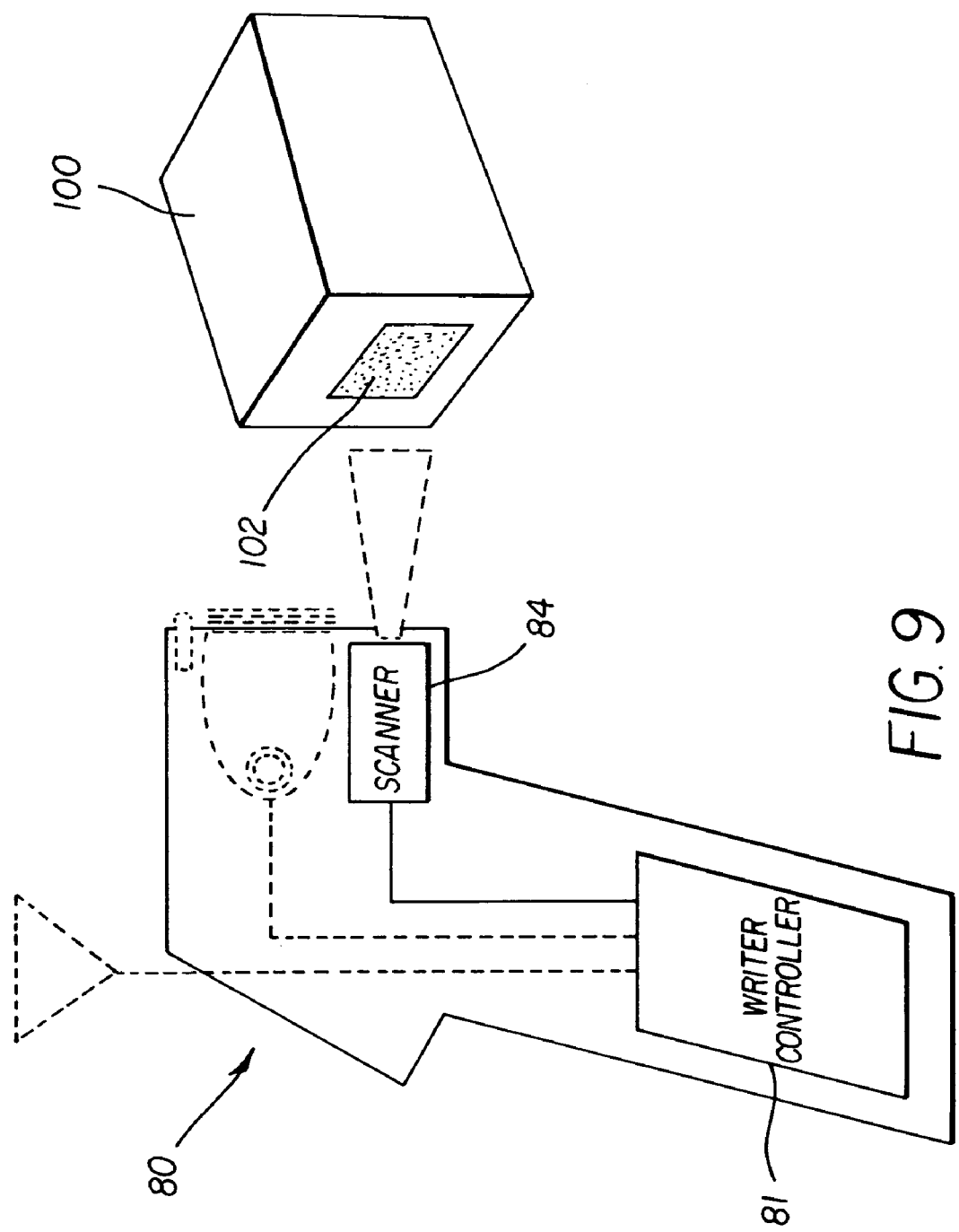
FIG. 9 is a schematic view of a writer scanning an object identity code according to the present invention.

FIG. 8 is a schematic view of a hand held scanner/writer 80 used with the present invention. As shown in FIG. 9, scanner 84 in scanner/writer 80 can determine an object identification code 102. Scanner 84 can be a conventional bar code reader that can read a bar code from an object to determine the object identification code. Alternatively, scanner 84 can be an radio frequency (RF) tag scanner that retrieves object identification code 102 from an object having an attached RF data storage element. Writer controller 81 can contain internal memory means that provides a label image for one or more object identification codes 102, or can use writer antenna 88 to access label data wirelessly from an external data source. Scanner/writer 80 further incorporates flash unit 82 to provide high intensity light. High intensity light emitted by flash unit 82 is masked by a masking display 83 connected to writer controller 81. Writer contacts 86 are connected to writer controller 81 to permit application of an electric field in conjunction with flash unit 82 to electro-optically writer data image associated with object identification code 102 to display 10.

Figure 10:
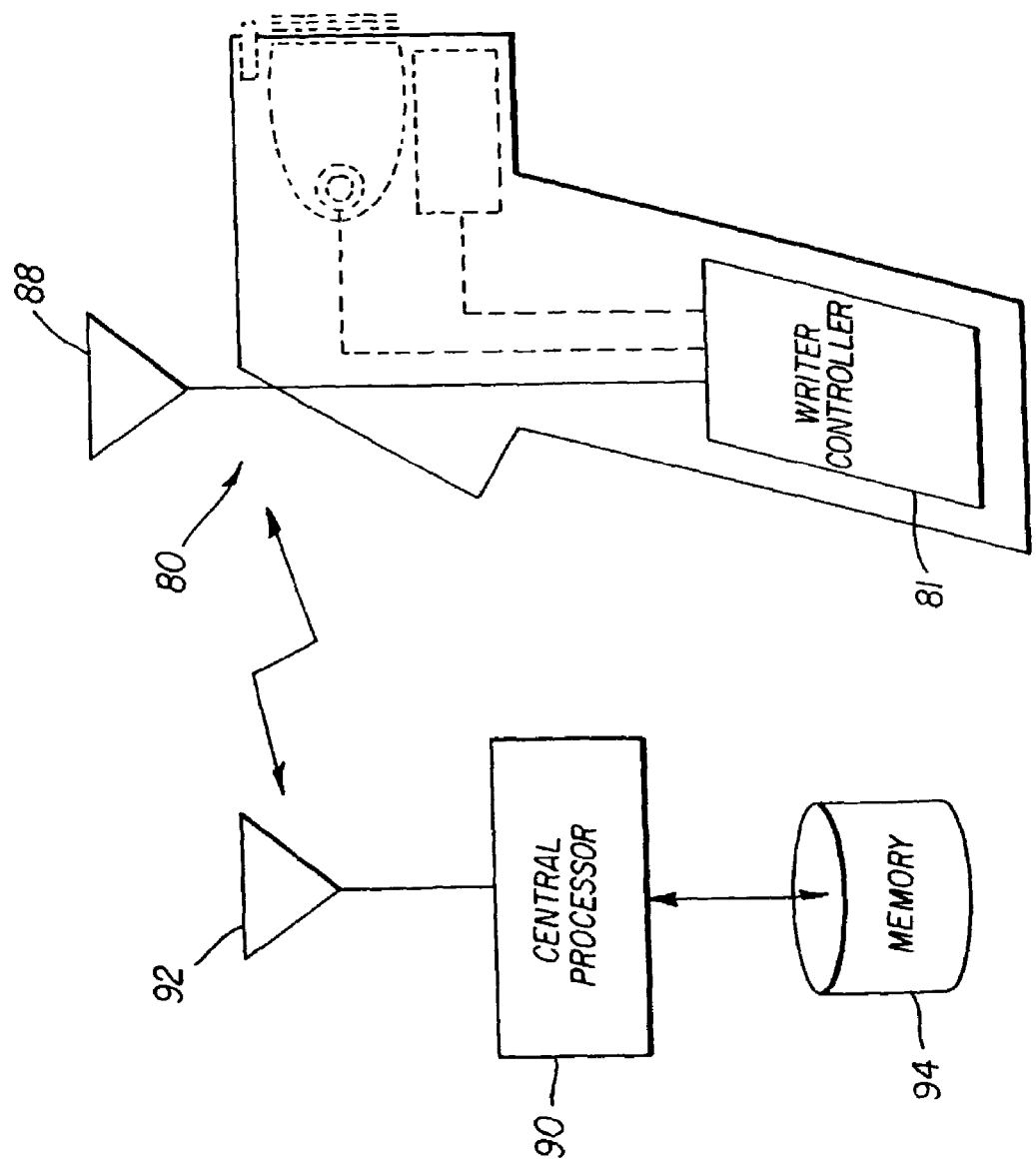
FIG. 10 is a schematic view of a writer obtaining label information for a specific object identity code from a central processor using wireless transmission according to the present invention.

FIG. 9 is a schematic view of the scanner/writer scanning an object identity code. Writer controller is activated to acquire an object identification code 102. Object identification code 102 can be received as an optical or radio signal from storage means attached or unattached to object 100. FIG. 10 is a schematic view of the scanner/writer 80 obtaining label information for a specific object identity code 102 from a central processor 90 using wireless transmission. Writer controller 81 obtains an object identification code 102 as shown in FIG. 9 and transmits the object identification code 102 though a wire (not shown), or wirelessly through writer antenna 88, to central processor 90. Central processor operates on the object identification code 102 to retrieve a label image from memory 94. Image data can contain pricing information, date and time information, a quantity or location data. Central processor 90 can transmit the image data back to scanner/writer 80 wirelessly using processor antenna 92 to both receive and send data.

Figure 11:
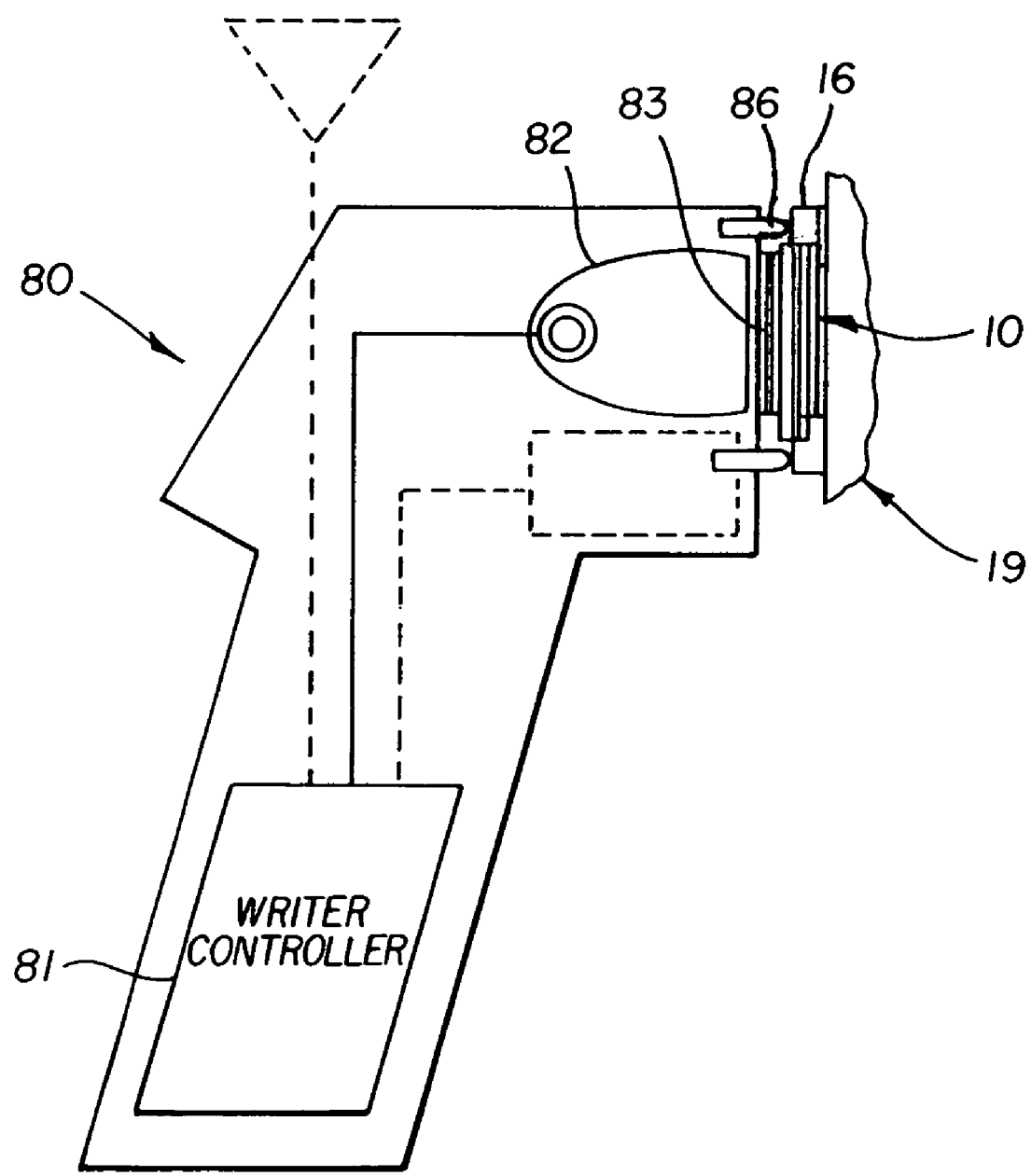
FIG. 11 is a schematic view of a writer writing a display using label information for a specific object according to the present invention.

FIG. 11 is a schematic view of scanner/writer 80 imprinting display 10 using label information for an object identification code 102. Writer controller 81 contains image data for an object identification code 102 and is prepared to write to label 19. Scanner/writer 80 and label 19 are brought together using conventional means. In a first case, label 19 can be removed from a holder (not shown) and inserted into the body of scanner/writer 80. In a second case, scanner/writer 80 or portions containing flash unit 82, masking display 83 and writer contacts 86 are pressed against label 19. Contacts 85 of scanner/writer 80 are pressed against support contacts 16 to provide an electrical field to display 10. Masking display 83 is brought into alignment with an area to be written onto a display 10 attached to label 19. Sensors connected to writer controller 81 can verify that the correct alignment has been made between label 19 and scanner/writer 80.

Writer controller 81 first transmits image data corresponding to an image for object identification code 102 to masking display 83. Writer controller 81 then applies an electrical field across display 10 using writer contacts 86 and fires flash unit 82 to imprint the label image on masking display 83 onto display 10. Scanner/writer 80 can be disengaged from fixed labels, providing an inexpensive electrically rewritable ESL. A label 19 that has been removed from a holder can be disengaged from scanner/writer 80 and re-mounted onto the holder.

The method and apparatus of this invention provides low cost, simple and rapidly written shelf labels with high information content. The scanner/writer provides a simple and accurate means for identifying an object associated to be labeled and for retrieving an image for the label associated with the object. The labels are inexpensive, having a few simple, unpatterned, mass produced layers. The writing apparatus itself is simple, requiring a low cost flash unit system, an inexpensive masking display and a 2 wire electrical exciter for the display 10. Separating the drive from the display permits many inexpensive labels 19 to be written by a single, simple display writer 90.

The invention has been described in detail with particular reference to certain preferred embodiments thereof, but it will be understood that variations and modifications can be effected within the spirit and scope of the invention.

PARTS LIST 10 display
14 printing
15 display substrate
16 support contacts
17 display support
19 label
20 first conductor
22 exposed portion of first conductor
30 cholesteric liquid crystal light modulating layer
35 light absorber
40 second conductor
60 incident light
62 reflected light
72 planar liquid crystal
74 focal conic liquid crystal
80 scanner/writer
81 writer controller
82 flash unit
83 masking display
84 scanner
86 writer contacts
88 writer antenna
90 central processor
92 processor antenna
94 central memory
100 object
102 object identification code

What is claimed is:

1. A display system, comprising:
   a) a light writeable display associated with an identification code and arranged to receive an image wise pattern of light under a constant electric field to form an image on the display, wherein the light writeable display includes: a pair of conductors, at least one conductor being transparent; a layer of cholesteric liquid crystal material disposed between the conductors, the cholesteric liquid crystal material having multiple stable optical states at zero electrical field; and a light absorber for forming an image wise thermal pattern in the cholesteric liquid crystal sufficient to change the optical state of the cholesteric liquid crystal in response to an image wise pattern of light;
   b) a display writer for producing the image wise pattern of light for writing the image on the display;
   c) a scanner connected to the display writer for sensing the identification code; and
   d) a processor linked to the scanner and the display writer and responsive to the identification code for programming the display writer to write an image associated with the identification code.

2. The display system claimed in claim 1, wherein the identification code is a UPC (Universal Product Code).

3. The display system claimed in claim 1, wherein the identification code is on a holder for the light writeable display.

4. The display system claimed in claim 1, wherein the light writeable display is a shelf tag.

5. The display system claimed in claim 1, wherein the light writeable display is a product label.

6. The display system claimed in claim 1, wherein the light writeable display is a shelf talker.

7. The display system claimed in claim 1, wherein the identification code is on a light writeable display.

8. The display system claimed in claim 2, further comprising a central processor containing display information associated with the identification code that is linked to the scanner and the display writer by a wireless communication link.

9. The display system claimed in claim 1, wherein the light writeable display is attached to a support having contacts for making contact with the conductors on the light writeable display and for providing external access to the conductors.

10. The display system claimed in claim 9, wherein the support includes a printable surface.

11. The display system claimed in claim 10, wherein the identification code is printed on the printable surface of the support.

12. The display system claimed in claim 9, wherein the display writer includes: a light source for producing a flash unit of light of sufficient intensity to generate sufficient heat in the light absorber to change the optical state of tine cholesteric liquid crystal; an electronically programmable mask located between the light source and the display for defining the image wise pattern of light; a display drive connectable to the contacts for generating an electric field between the conductors for changing the optical state of the cholesteric liquid crystal; and a controller connected to the light source and the display drive for controlling the intensity of the electrical field and actuating the light source to create an image on the display.

13. The display system claimed in claim 9, wherein the contacts are conductive ink.

14. The display system claimed in claim 9, wherein the conductive ink is carbon in a polymer binder.

15. The display system claimed in claim 9, wherein the display is attached to the support by the conductive ink.

16. The display system claimed in claim 9, wherein the display is attached to the support by an anisotropic conductive adhesive providing electrical connection between the conductors of the display and the contacts on the support.

17. The display system claimed in claim 9, wherein the support has an adhesive backing.

18. The display system claimed in claim 9, wherein the polymer dispersed material is a dried emulsion of cholesteric liquid crystal in gelatin.

19. The display system claimed in claim 1, wherein the scanner is a bar code scanner.

20. The display system claimed in claim 1, wherein the scanner is a radio frequency tag scanner.

21. The display system claimed in claim 1, wherein the scanner and the writer are included in a hand held unit.

* * * * *

UNITED STATES PATENT AND TRADEMARK OFFICE
CERTIFICATE OF CORRECTION

PATENT NO. : 7,131,584 B2  Page 1 of 1
APPLICATION NO. : 10/712175
DATED : November 7, 2006
INVENTOR(S) : Stanley W. Stephenson, III et al.

It is certified that error appears in the above-identified patent and that said Letters Patent is hereby corrected as shown below:

Column 8, line 56, Claim 8    Replace "claim 2" with --claim 1--
Column 9, line 7, claim 12    Replace "tine" with --the--

Signed and Sealed this

Tenth Day of April, 2007

JON W. DUDAS
*Director of the United States Patent and Trademark Office*